(12) United States Patent
Nakahata

(10) Patent No.: US 7,548,361 B2
(45) Date of Patent: Jun. 16, 2009

(54) IMAGE FORMING APPARATUS

(75) Inventor: Hiroshi Nakahata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 11/567,424

(22) Filed: Dec. 6, 2006

(65) Prior Publication Data
US 2007/0139747 A1 Jun. 21, 2007

(30) Foreign Application Priority Data
Dec. 21, 2005 (JP) ............... 2005-368252

(51) Int. Cl.
G02B 26/08 (2006.01)
(52) U.S. Cl. ............... 359/204.1; 359/216.1; 347/243; 347/261
(58) Field of Classification Search ............. 359/201.1, 359/201.2, 204.1
See application file for complete search history.

(56) References Cited

U.S. PATENT DOCUMENTS 7,099,061 B2 * 8/2006 Tamaru .............. 359/204.1

2007/0053036 A1 * 3/2007 Iwai .................. 359/201

FOREIGN PATENT DOCUMENTS

JP 09-146333 A 6/1997

* cited by examiner

Primary Examiner—James Phan
(74) Attorney, Agent, or Firm—Canon U.S.A., Inc., IP Division

(57) ABSTRACT

At least one exemplary embodiment is directed to an image forming apparatus, which includes: a first to fourth image bearing members on which toner images of four colors of yellow, magenta, cyan, and black are formed respectively; a first rotatable polygon mirror for deflecting and scanning laser beams on the first to fourth image bearing members so as to form electrostatic latent images on the first to fourth image bearing members; a detachable fifth image bearing member on which a toner image of a color different from the four colors is formed; and a detachable optical unit including a second rotatable polygon mirror that deflects and scans a laser beam on the fifth image bearing member so as to form an electrostatic latent image on the fifth image bearing member.

5 Claims, 8 Drawing Sheets ized polygon mirror is used, as shown in FIG. 6.

IMAGE FORMING APPARATUS

BACKGROUND OF THE INVENTION

1. Field of the Invention

The present invention relates to an image forming apparatus, and more particularly, though not exclusively, to the configuration of a scanning optical device in an image forming apparatus.

2. Description of the Related Art

Known image forming apparatuses will be described with reference to FIGS. 5 to 9.

FIG. 5 shows an image forming apparatus that prints a color image. The image forming apparatus includes independent image bearing members (hereinafter referred to as photoconductive drums) corresponding to yellow, magenta, cyan, and black colors. Each photoconductive drum is composed of a conductor coated with a photosensitive layer, and is included in a corresponding image forming unit. An electrostatic latent image is formed on the photoconductive drum by using laser light emitted from a scanning optical device 21. The scanning optical device 21 emits laser light according to image information sent, for example, from an image reader or a personal computer. Each image forming unit also includes a developing device 22 that forms a toner image on the photoconductive drum with frictionally charged toner. Toner images formed on the photoconductive drums are superimposed on an intermediate transfer belt 23. A sheet cassette 24 is provided at the bottom of the apparatus, and stores recording materials onto which toner images are transferred. A fixing device 25 adsorbs transferred toner images on the recording materials by heat. After fixing, the recording materials are stacked in an output tray 26. Each image forming unit also includes a cleaning device 27 that cleans the corresponding photoconductive drum of residual toner.

An electrostatic latent image is formed on each photoconductive drum charged by a charging device by applying laser light from the scanning optical device 21 onto the photoconductive drum according to image information. Subsequently, toner frictionally charged in the developing device 22 adheres to the electrostatic latent image so as to form a toner image on the photoconductive drum. The toner image is then transferred from the photoconductive drum onto the intermediate transfer belt 23, and is transferred again onto a recording material supplied from the sheet cassette 24. The toner image transferred on the recording material is fixed by the fixing device 25, and the recording material is ejected in the output tray 26.

FIG. 6 shows the scanning optical device 21 shown in FIG. 5. Since the scanning optical device 21 has a bilaterally symmetrical structure, components only in one side of the device are denoted by reference numerals in the figure. In the scanning optical device 21, two laser beams enter each side of a single polygon mirror 28 so that the photoconductive drums are exposed to irradiation light beams E1 to E4. The scanning optical device 21 adopts an oblique incident optical system, and second focusing lenses are arranged so that laser light beams pass therethrough after being separated. Herein, an oblique incident optical system refers to an optical system in which laser light is obliquely incident on the polygon mirror and upper and lower optical paths are separated after the laser light exits from the polygon mirror. When it is assumed that a plane (X-Y plane) defined by the normal to the surface of the polygon mirror 28 and the rotating direction of the polygon mirror 28 is designated as a base plane, as shown in FIG. 7, laser light beams enter the base plane at different angles (these angles will be referred to as oblique incident angles).

Optical components of the scanning optical device 21 are mounted in an optical box 33, and are shielded from the outside by an upper cover 34 that closes the optical box 33. Dustproof glasses 32 are provided in the upper cover 34 so as to protect the scanning optical device 21 from dust.

Two laser beams exiting from the polygon mirror 28 pass through a first focusing lens 29. One of the laser beams traveling on the photoconductive-drum side is reflected downward by a separation folding mirror 31c. The first focusing lens 29 is formed of a cylindrical lens because the laser beams are incident thereon at different angles. The laser beams are focused in the sub-scanning direction by second focusing lenses 30 placed in the optical paths thereof. The laser light beam E2 reflected by the separation folding mirror 31c, crosses the other laser beam E1, and travels away from the photoconductive drum. The laser light beam E2 then passes through one of the second focusing lens 30, and is reflected again by a folding mirror 31b placed on the lower surface of the optical box 33, and then passes beside the first focusing lens 29, and is applied onto the photoconductive drum.

Each of the laser beams E1 and E4 to be applied onto the photoconductive drums, provided at both ends, passes between the separation folding mirror 31c and the folding mirror 31b, passes through one of the second focusing lens 30, is reflected by a folding mirror 31a, and is applied onto the corresponding photoconductive drum. The separation folding mirror 31c is positioned so that two laser beams are not blocked, for example, because of parts tolerances or tilting of a polygon motor.

A description will now be given of the characteristics of the oblique incident optical system. By adopting the oblique incident optical system in the scanning optical device, a plurality of beams can be simultaneously subjected to deflection scanning without increasing the size of the device.

In contrast, in the oblique incident optical system, pitch nonuniformity (hereinafter referred to as tilting) due to decentering of the polygon mirror increases in principle, compared with an optical system in which the oblique incident angle is zero, that is, light beams perpendicularly enter the reflecting surface of the polygon mirror. This results from decentering of the reflecting surface of the polygon mirror from the rotating shaft of the polygon motor.

FIG. 8 shows the path of a light beam near the polygon mirror in the oblique incident optical system. In FIG. 8, a light beam is incident on the polygon mirror 28, which is decentered from the rotating shaft by a distance d, at an oblique incident angle α. Normally, decentering is caused by two factors, namely, variation among polygon mirrors and rattling between the rotating shaft of the motor and the polygon mirror.

When the polygon mirror is decentered from the rotating shaft by d, as shown in FIG. 8, the reflecting surface of the polygon mirror is displaced by d in one rotation of the polygon mirror. In the oblique incident optical system, the reflecting position on the polygon mirror is changed by this decentering, and the light beam deviates in the sub-scanning direction, as shown by a broken line 800 in FIG. 8. As a result, sub-scanning deviation having the same frequency as tilting (rotational frequency of the polygon mirror) occurs. Since tilting due to decentering increases as the oblique incident angle increases, it should be minimized. For this reason, when laser light is scanned by one rotatable polygon mirror in an image forming apparatus including more than four photoconductive drums, an optical path which is not optically symmetrical in the right-left and up-down directions of the rotatable polygon mirror is produced, and the performance of this optical path becomes lower than that of other optical paths.

On the other hand, there is an increasing demand to improve the quality of images formed by image forming apparatuses. For that purpose, image formation has been performed with popular yellow, magenta, cyan, and black toners and other color toners. In order to achieve this type of image formation, an image forming apparatus can include five or more photoconductive drums. Japanese Patent Laid-Open No. 09-146333 discusses an image forming apparatus including five image forming units corresponding to basic colors of yellow, magenta, cyan, and black and to a particular color of matte black, as shown in FIG. 9. In each image forming unit, exposure is performed by a specific scanning optical device.

However, when the image forming unit for forming an image of a particular color is added, the number of photoconductive drums increases, and this tends to increase the size of the image forming apparatus. In contrast, image exposure for a plurality of photoconductive drums can be performed by using one rotatable polygon mirror without preparing an exposure unit corresponding to each of the photoconductive drums. That is, photoconductive drums are provided to form images with yellow, magenta, cyan, and black toners, and electrostatic latent images are formed thereon by image exposure with one rotatable polygon mirror. In this case, in order to apply laser light for image exposure onto a photoconductive drum on which a particular color toner image is formed, it is conceivable that the following configuration can be adopted. That is, laser light is deflected and scanned on photoconductive drums for basic colors of yellow, magenta, cyan, and black and a particular color by one rotatable polygon mirror. This configuration not only can reduce the number of rotatable polygon mirrors, but also can reduce the distance between the photoconductive drums.

In the above-described configuration, however, the oblique incident angles need to be larger than in the case when light is deflected and scanned on four photoconductive drums. Tilting is worsened by the increase in the oblique incident angles, and this can be a serious problem in maintaining the high image quality of the image forming apparatus. While it can be necessary to increase the precision of the rotatable polygon mirror and the precision of the rotating shaft in order to overcome this problem, it is difficult to completely avoid tilting.

In a method shown in FIG. 10, the above-described oblique incident optical system is not used, and the oblique incident angle is zero, that is, laser light beams perpendicularly enter a reflecting surface of a polygon mirror. In this optical system, the laser light beams also need to be separated while traveling toward photoconductive drums, and the vertical distance between the separated laser beams needs to be large. For this reason, when exposure is performed on more than four photoconductive drums by the optical device using one polygon mirror, the thickness of the polygon mirror increases, and this causes problems of, for example, driving load, vibration, noise, and heat generation.

SUMMARY OF THE INVENTION

The present invention provides an image forming apparatus (e.g., electrophotographic copying machine, electrophotographic printer) that achieves size reduction without lowering scanning performance of laser beams even when the image forming apparatus includes five or more image bearing members.

An image forming apparatus according to an aspect of at least one exemplary embodiment of the present invention includes: first to fourth image bearing members on which toner images of four colors of yellow, magenta, cyan, and black are formed respectively; a first rotatable polygon mirror for deflecting and scanning laser beams on the first to fourth image bearing members so as to form electrostatic latent images on the first to fourth image bearing members; a fifth image bearing member on which a toner image of a color different from the four colors is formed, the fifth image bearing member being detachably mounted in the image forming apparatus; and an optical unit detachably mounted in the image forming apparatus and including a second rotatable polygon mirror that deflects and scans a laser beam on the fifth image bearing member so as to form an electrostatic latent image on the fifth image bearing member.

Further features of the present invention will become apparent from the following description of exemplary embodiments with reference to the attached drawings.

DESCRIPTION OF THE EMBODIMENTS

The present invention will be described in more detail below with reference to exemplary embodiments. It should be noted that these exemplary embodiments are just examples for carrying out the invention and that the invention is not limited by the exemplary embodiments.

First Exemplary Embodiment

Figure 1:
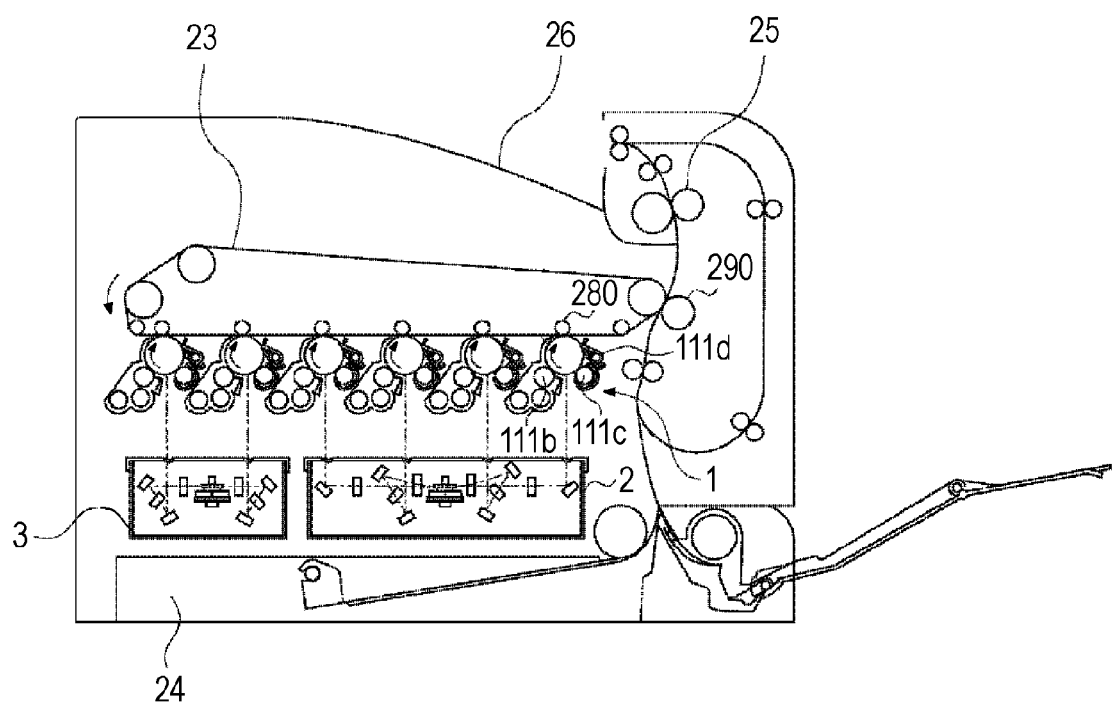
FIG. 1 is an explanatory view of an image forming apparatus according to a first exemplary embodiment of the present invention.

An image forming apparatus according to a first exemplary embodiment of the present invention will be described with reference to FIG. 1. In the first exemplary embodiment, a plurality of photoconductive drums can be mounted as image bearing members on which toner images of yellow, magenta, cyan, black, light cyan, and light magenta colors are formed. Light cyan is a light color that has the same hue as that of cyan and that is paler than cyan. Light magenta is a light color that has the same hue as that of magenta and that is paler than magenta. The image forming apparatus includes below-described scanning optical devices 2 and 3 that emit laser light according to image information supplied from, for example, an image reader or a personal computer, and a plurality of image forming units. Each of the image forming units includes a photoconductive drum composed of a conductor coated with a photosensitive layer, a developing device 111b for forming a toner image on the photoconductive drum with frictionally charged toner, a charging roller 111c serving as a charging member for charging the photoconductive drum, and a cleaning member 111d. A primary transfer member 280 transfers a toner image from the photoconductive drum onto an intermediate transfer belt 23 serving as an intermediate transfer member. The cleaning member hid removes residual toner from the photoconductive drum after the toner image is transferred onto the intermediate transfer belt 23. A sheet cassette 24 disposed at the bottom of the apparatus stores recording materials on which toner images are formed. A fixing device 25 fixes a transferred toner image on a recording material by heat and pressure. After fixing, recording materials are stacked in an output tray 26. In the first exemplary embodiment, each image forming unit can be formed of a detachable cartridge such that the photoconductive drum, the developing device 111b, the charging member 111c, and the cleaning member 111d contained in the cartridge can be detached together. Cartridges corresponding to different toner colors are arranged in a manner shown in FIG. 1.

An image forming process will now be described. In each cartridge, a toner image to be transferred onto the intermediate transfer belt 23 is formed. When laser light is applied from the scanning optical device 2 or 3 onto the photoconductive drum according to image information, an electrostatic latent image is formed on the photoconductive drum charged by the charging member 111c. Then, the electrostatic latent image is developed with frictionally charged toner in the developing device 111b. The developed toner image is transferred onto the intermediate transfer belt 23 by the primary transfer member 280. Toner remaining on the photoconductive drum after transfer is removed by the cleaning member 111d. In order to form a color image, toner images formed in the cartridges are transferred and superimposed on the intermediate transfer belt 23. The superimposed toner images are transferred from the intermediate transfer belt 23 onto a recording material, which is conveyed from the sheet cassette 24, by a secondary transfer member 290, whereby a color toner image is formed on the recording material. The color toner image is then fixed by the fixing device 25, and the recording material is put into the output tray 26. The photoconductive drums and the intermediate transfer belt 23 rotate in the directions shown by the arrows in FIG. 1.

Figure 2:
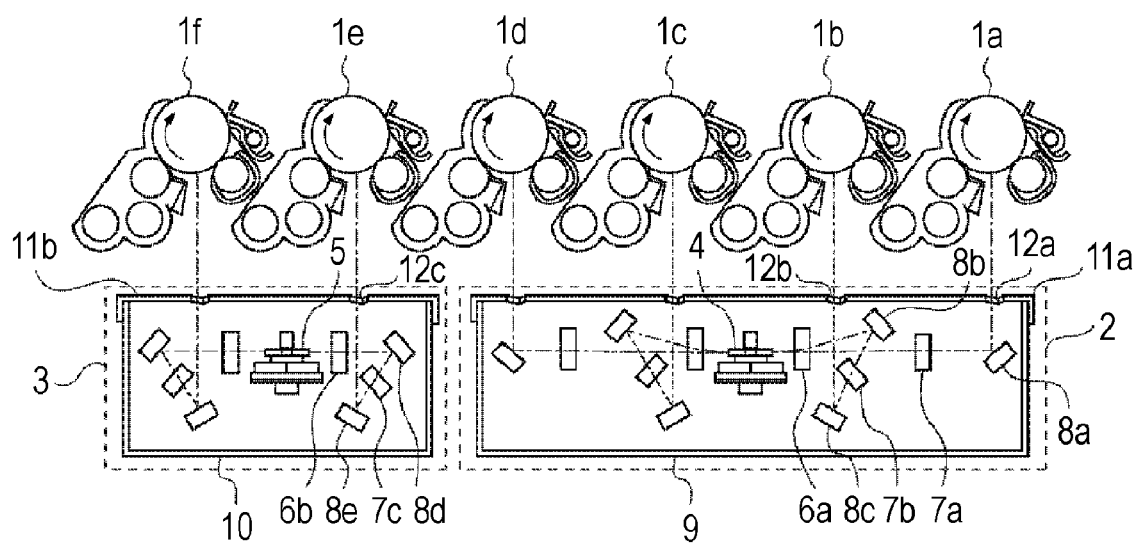
FIG. 2 is an explanatory view of an image forming section in the image forming apparatus of the first exemplary embodiment.

FIG. 2 is an enlarged view of scanning optical devices and a plurality of cartridges mounted in the image forming apparatus according to the first exemplary embodiment of the present invention.

In the first exemplary embodiment, six cartridges are arranged. Photoconductive drums 1a to 1d (first to fourth image bearing members) are arranged corresponding to four toner colors of yellow, magenta, cyan, and black. A scanning optical device 2 including one rotatable polygon mirror is provided to expose the four photoconductive drums 1a to 1d.

Beside the scanning optical device 2, a scanning optical device 3 including one polygon mirror is provided to expose photoconductive drums 1e and 1f (fifth and sixth image bearing members) for colors different from the above four colors, for example, two particular colors of light cyan and light magenta. Light cyan is the same in hue as cyan, but different in density from cyan, and light magenta is the same in hue as magenta, but different in density from magenta.

The scanning optical devices 2 and 3 have a structure symmetrical with respect to the polygon mirror. For this reason, only one side of each of the scanning optical devices 2 and 3 will be described in the first exemplary embodiment. The scanning optical devices 2 and 3 respectively include rotatable polygon mirrors 4 and 5 that deflect and scan laser beams. First focusing lenses 6a and 6b form spots of laser beams on the photoconductive drums. Second focusing lenses 7a to 7c form spots of laser beams on the photoconductive drums as well as the first focusing lenses 6a and 6b. The first and second focusing lenses 6a, 6b, 7a, 7b, and 7c are called f-θ lenses.

In these scanning optical devices 2 and 3, a plurality of beams enter the same surface of the polygon mirror at different oblique incident angles in order to separate the beams deflected and scanned by the polygon mirror. For this reason, each of the first focusing lenses 6a and 6b is formed of a cylindrical lens that does not have a refracting power in the sub-scanning direction, in a manner similar to that in the related art.

Folding mirrors 8a to 8e serve as reflecting plates that reflect laser beams passing through the first focusing lenses 6a and 6b in a predetermined direction. The optical elements are supported and fixed in optical boxes 9 and 10 serving as first and second optical units.

Laser beams are emitted from four light sources in the optical box 9 of the scanning optical device 2, and laser beams are emitted from two light sources in the optical box 10 of the optical scanning device 3. The emitted laser beams are deflected and scanned in a bilaterally symmetrical manner by the center polygon mirror. The scanned beams are transmitted and reflected in the above-described optical system, pass through dust-proof glasses 12a to 12c provided in upper covers 11a and 11b that shield the optical boxes 9 and 10, and are applied onto the photoconductive drums 1a to 1f.

In each optical system shown in FIG. 2, since the oblique incident angles of the beams are equal and symmetrical, all the beams have about the same optical performance represented by the spot diameter, tilting, and depth. In the optical box 9, the photoconductive drums for four colors, yellow, magenta, cyan, and black are exposed to beams deflected and scanned by one polygon mirror. Further, in the optical box 10, the other photoconductive drums are exposed to light beams deflected and scanned by one polygon mirror. In at least one exemplary embodiment of the present invention, deflection and scanning of light beams on up to four photoconductive drums are performed by one polygon mirror. This is because, when the number of photoconductive drums is up to four, the oblique incident angles of the exposure beams can be made the same by making the oblique incident angles symmetrical. The oblique incident angles can be set to be small so that vignetting of the beams is not caused by the optical members such as the mirror. Therefore, the highest performance of the oblique incident optical system can be maintained.

Even in the optical system in which the oblique incident angles are zero, that is, in which light beams are deflected and scanned perpendicularly to the reflecting surface of the polygon mirror, it is realistic that up to two light beams are incident on the same reflecting surface, as in the description of the related art. In this case, the photoconductive drums for only up to four colors can be exposed, in a manner similar to that in the oblique incident optical system. In this way, the same optical performance can be maintained using one polygon mirror as long as the number of photoconductive drums is up to four. In the first exemplary embodiment, the same polygon mirror can deflect and scan light beams on the photoconductive drums on which electrostatic latent images of basic colors of yellow, magenta, cyan, and black are formed. Further, since the optical systems for forming the electrostatic latent images of the basic colors are stored in the same scanning optical device 2, optical adjustments, such as tilting and curving of the scanning beams and magnification, are made with consideration of the relationship among the four colors. As a result, color misregistration among the basic four color images can be prevented properly and/or reduced.

Four basic colors of yellow, magenta, cyan, and black are frequently used for image formation, and it is useful to prevent and/or reduce color misregistration among these colors more properly than in particular colors that are used to improve gradation and enhance color reproduction of secondary colors. Further, laser light beams for exposing the photoconductive drums for the other colors are deflected and scanned by one polygon mirror other than the polygon mirror for the four basic colors. This can achieve the same optical performance as that for the four colors, and can prevent and/or reduce the chances of the size of the apparatus from being increased with the increase in number of photoconductive drums.

In the first exemplary embodiment, the laser light sources, the optical components, the polygon mirror, and so on for forming electrostatic latent images of four basic colors of yellow, magenta, cyan, and black are stored in the same unit, and can be detached together from the image forming apparatus. Further, the laser light sources, the optical components, the polygon mirror, and so on for forming electrostatic latent images of particular colors of light cyan and light magenta are stored in the same unit, and can be detached together from the image forming apparatus. The image forming apparatus includes mounting portions where the image forming units and the second optical unit for the particular color inks are mounted, and guide portions for guiding these units.

The first optical unit for four basic colors and the second optical unit for particular colors can be independently attached to and detached from the image forming apparatus. Therefore, in an image forming apparatus in which an image forming unit for a particular color can be mounted as an option, when the image forming unit for the particular color is not mounted, an optical unit for the particular color does not need to be mounted. For this reason, the number of components of the image forming apparatus can be reduced. In contrast, when the image forming unit for the particular color is mounted as an option, the optical unit for the particular color is mounted so as to form an image of the particular color. This configuration allows the optical unit for the particular color to be easily mounted without changing the optical unit for basic colors.

According to the first exemplary embodiment, even when the number of image bearing members is five or more, the size of the apparatus can be reduced without lowering the scanning performance of the laser beams. Moreover, the distance between the image bearing members and the height of the image forming apparatus can be reduced.

Other Exemplary Embodiments

Figure 3:
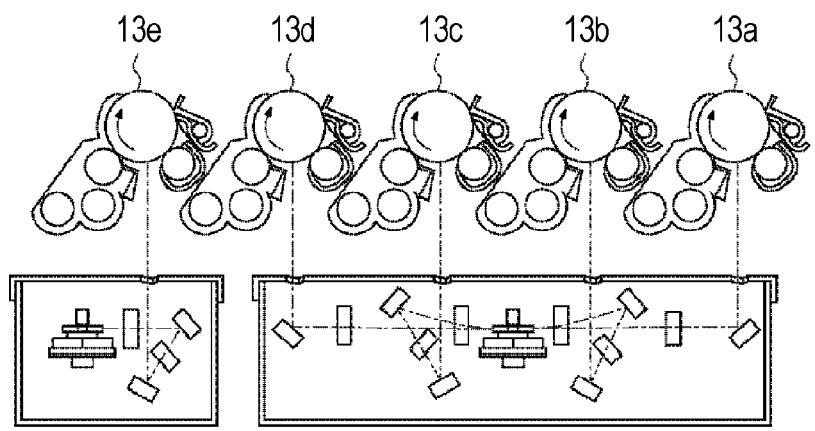
FIG. 3 is an explanatory view of an image forming section according to another exemplary embodiment of the present invention.
Figure 4:
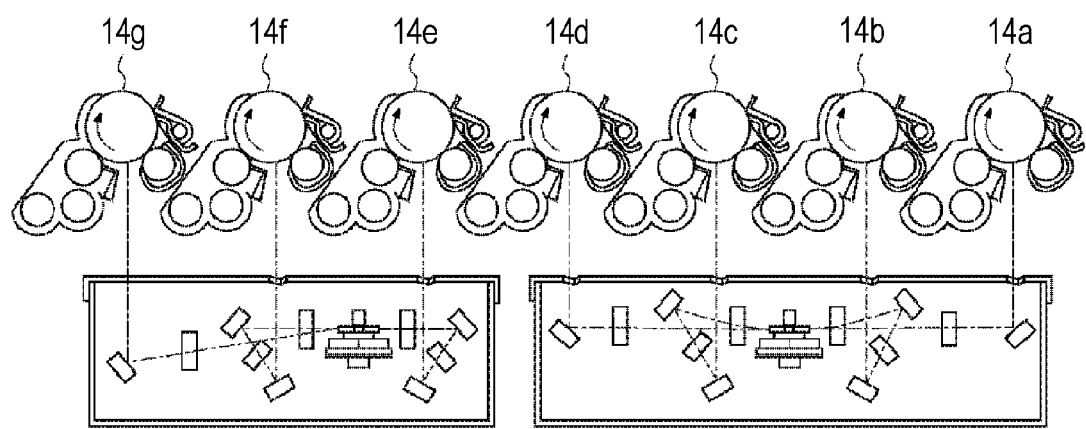
FIG. 4 is an explanatory view of an image forming section according to a further exemplary embodiment of the present invention.
Figure 5:
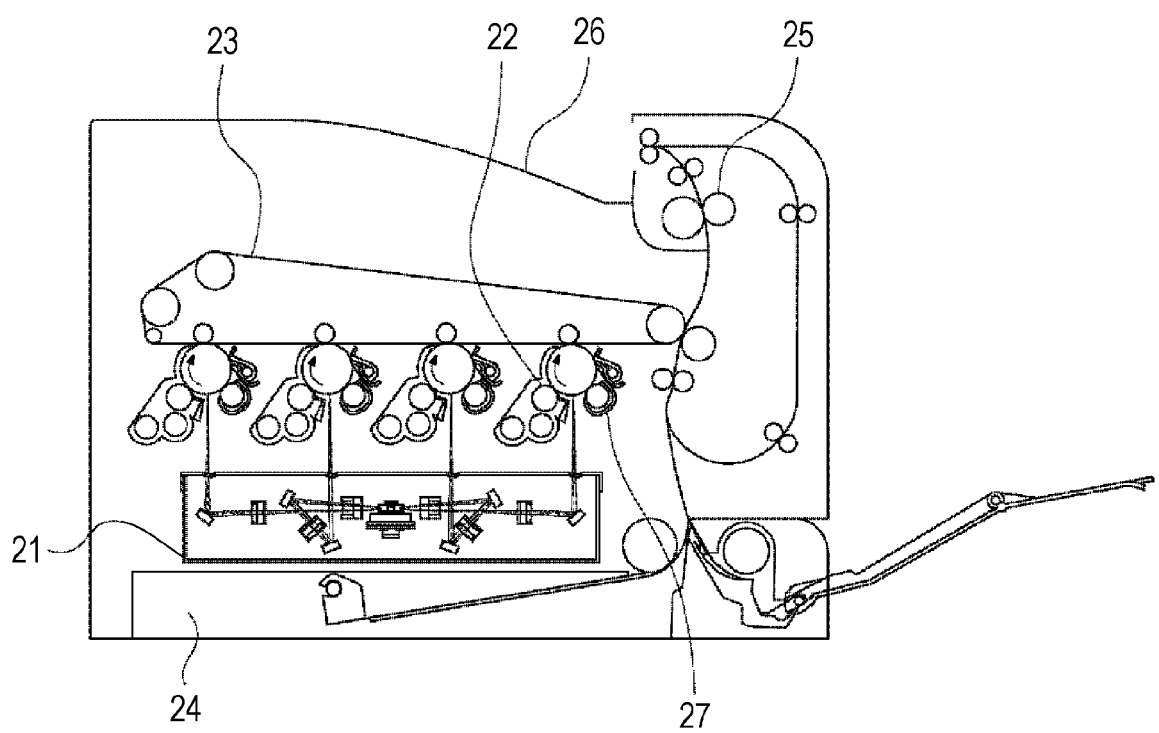
FIG. 5 is an explanatory view of an image forming apparatus as a related art.
Figure 6:
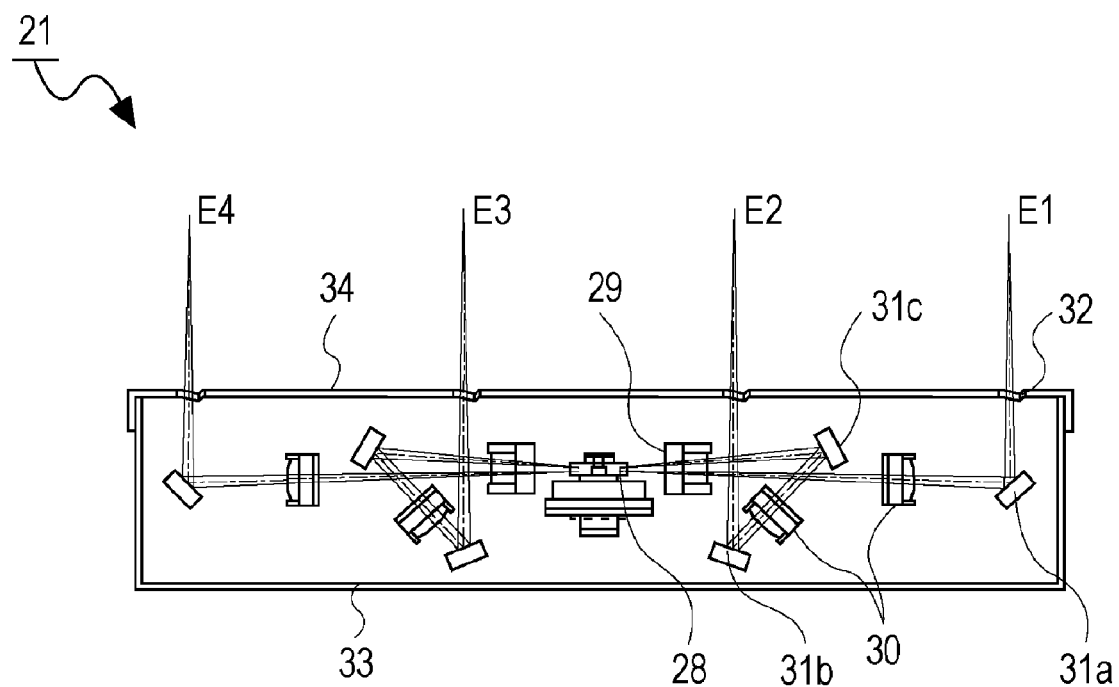
FIG. 6 is an explanatory view of a scanning optical device in the known image forming apparatus.
Figure 7:
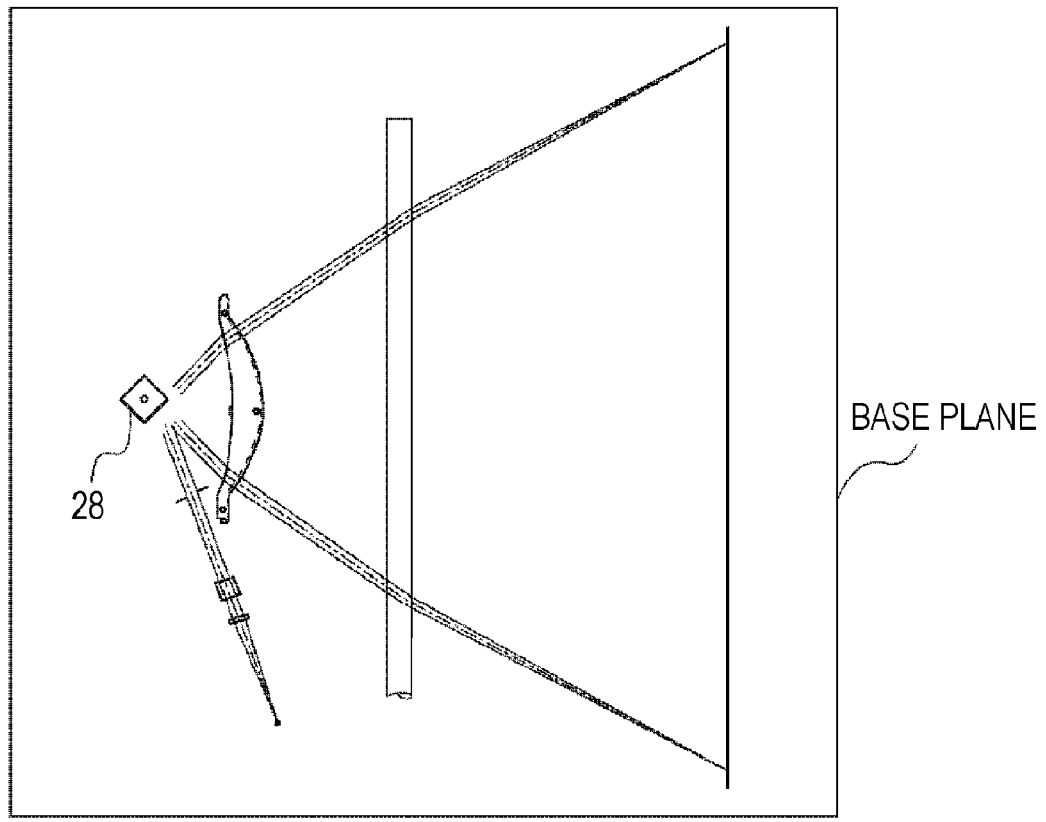
FIG. 7 is an explanatory view showing a base plane of the scanning optical device.
Figure 8:
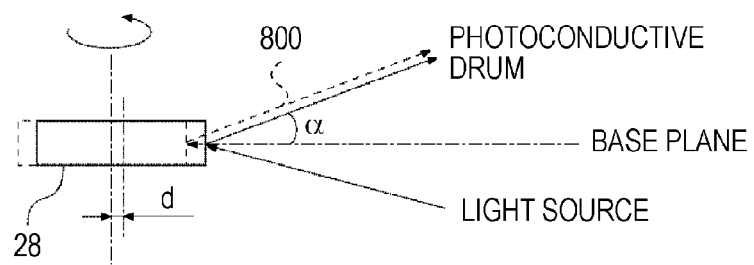
FIG. 8 is an explanatory view showing the influence of decentering of a rotatable polygon mirror.
Figure 9:
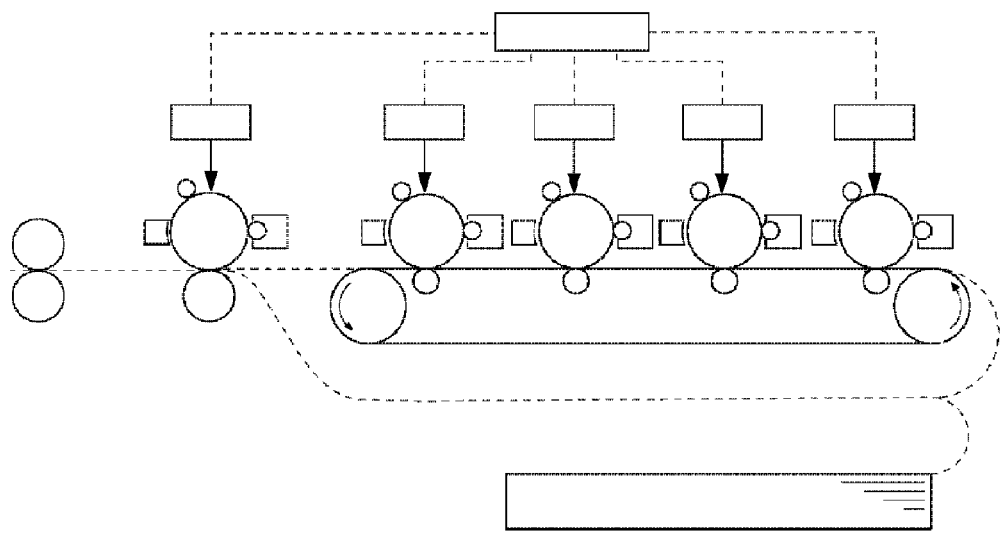
FIG. 9 is an explanatory view of an image forming section as another related art.
Figure 10:
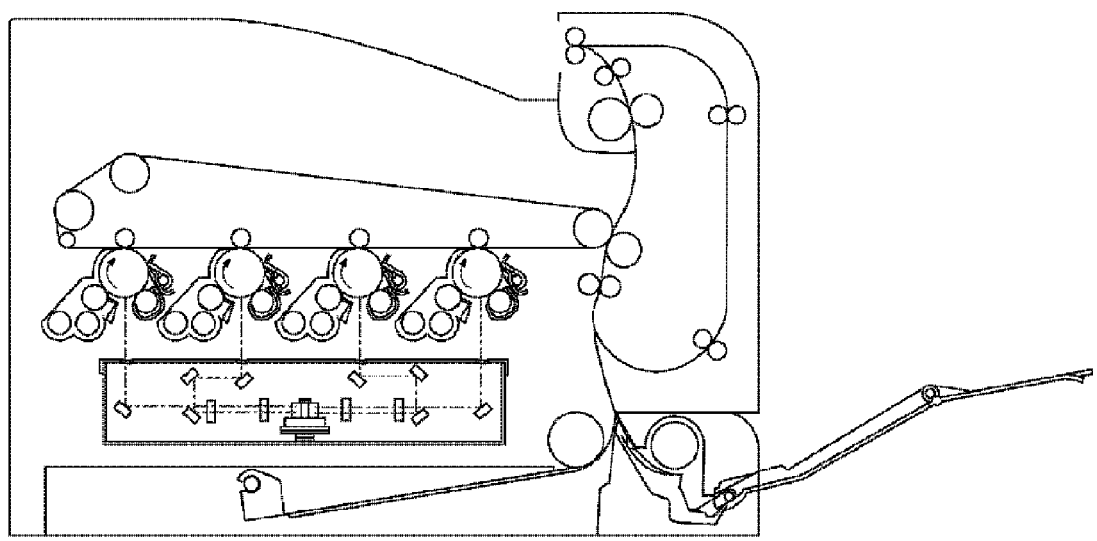
FIG. 10 is an explanatory view of an image forming section as a further related art.

While six image bearing members are provided in the first exemplary embodiment, any number of image bearing members may be provided as long as the number is five or more. FIG. 3 shows an exemplary embodiment in which five photoconductive drums are provided as image bearing members. FIG. 4 shows an exemplary embodiment in which seven photoconductive drums are provided, that is, a seventh image bearing member is added.

In the exemplary embodiment shown in FIG. 3, photoconductive drums 13a to 13d are provided to form yellow, cyan, magenta, and black images, respectively. In this exemplary embodiment, a scanning optical device is used in which light beams are deflected and scanned on these photoconductive drums 13a to 13d by a single polygon mirror. Onto a photoconductive drum 13e for forming an image of another color, laser light is applied by using a different single polygon mirror, in a manner similar to that shown in FIG. 2.

In the exemplary embodiment shown in FIG. 4, photoconductive drums 14a to 14d are provided to form yellow, cyan, magenta, and black images, respectively. In this exemplary embodiment, a scanning optical device is used in which light beams are deflected and scanned on these photoconductive drums 14a to 14d by a single polygon mirror. Onto photoconductive drums 14e to 14g for forming images of other colors, laser light is applied by using a different single polygon mirror, in a manner similar to that shown in FIG. 2. A light magenta image is formed on the photoconductive drum 14e, a light cyan image is formed on the photoconductive drum 14f, and a transparent toner image is formed on the photoconductive drum 14g.

The colors other than four basic colors of yellow, magenta, cyan, and black are not particularly limited to light cyan and light magenta, and can be, for example, a transparent color and white. The arrangements of the image forming units for basic colors and the image forming units for particular colors are not limited to those in the above-described exemplary embodiments.

The arrangements of the scanning optical devices are not limited to those in the above-described exemplary embodiments. It is obvious that some of the features of at least one exemplary embodiment of the present invention can be obtained as long as the oblique incident angles of all beams for exposing the four photoconductive drums are equal.

As described above, in the image forming apparatus that forms images of five or more colors, the photoconductive drums for four colors of yellow, magenta, cyan, and black are exposed by the optical scanning device in which a single polygon mirror performs deflection scanning. Other photoconductive drums are exposed by a different optical device using the same optical system as that in the scanning optical device for the four colors. When the number of photoconductive drums is four or less, deflection scanning for the photoconductive drums is performed by one polygon mirror. This can reduce color misregistration among four basic colors of yellow, magenta, cyan, and black. Moreover, all exposure beams can have the same optical performance, and the size of the apparatus can be prevented from being increased with the increase in number of photoconductive drums.

While each image forming unit (cartridge) includes the photoconductive drum, the charging member, the developing device, and the cleaning member in the above-described exemplary embodiments, it is satisfactory as long as the image forming unit includes at least a photoconductive drum. Further, while the photoconductive drums are used as image bearing members in the above-described exemplary embodiments, some of the features of at least one exemplary embodiment of the invention can be obtained even when photoconductive belts are used.

As described above, even when the number of image bearing members is five or more, the size of the image forming apparatus can be reduced without lowering the scanning performances of the laser beams.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-368252 filed Dec. 21, 2005, which is hereby incorporated by reference herein in its entirety.

What is claimed is:

1. An image forming apparatus comprising:
   first to fourth image bearing members on which toner images of four colors of yellow, magenta, cyan, and black are formed respectively;
   a first rotatable polygon mirror for deflecting and scanning laser beams on the first to fourth image bearing members so as to form electrostatic latent images on the first to fourth image bearing members;
   a fifth image bearing member on which a toner image of a color different from the four colors is formed, the fifth image bearing member being detachably mounted in the image forming apparatus; and
   an optical unit detachably mounted in the image forming apparatus and including a second rotatable polygon mirror that deflects and scans a laser beam on the fifth image bearing member so as to form an electrostatic latent image on the fifth image bearing member.

2. The image forming apparatus according to claim 1, wherein the first rotatable polygon mirror deflects and scans the laser beams in directions symmetrical with respect to an axis of the first rotatable polygon mirror, and the number of the laser beams deflected and scanned on one side of the axis is equal to the number of laser beams deflected and scanned on a side opposite to the one side.

3. The image forming apparatus according to claim 1, wherein each laser beam is entered to the first polygon mirror at an incident angle to a plane orthogonal to a rotary axis of the first rotatable polygon mirror.

4. The image forming apparatus according to claim 1, wherein the laser beams deflected and scanned by the same reflecting surface of the first rotatable polygon mirror are deflected and scanned at different height positions on the reflecting surface and at no angle to a plane orthogonal to a rotary axis of the first rotatable polygon mirror.

5. The image forming apparatus according to claim 1, further comprising:
   a sixth image bearing member on which a toner image of a color different from the four colors is formed and on which a laser beam is deflected and scanned by the second rotatable polygon mirror.

* * * * *